Patented Oct. 28, 1941

2,261,091

UNITED STATES PATENT OFFICE 2,261,091

WATERPROOFING COMPOSITION

James Francis Maguire, South Orange, N. J., assignor to Reichhold Chemicals, Inc., Detroit, Mich.

No Drawing. Application December 30, 1940, Serial No. 372,425

9 Claims. (Cl. 106—230)

This invention relates to a composition of matter suitable for coating fibers, fabrics, paper and other surfaces where waterproof conditions are desired.

Paraffin and other waxes have been commonly used for this purpose but they have disadvantages which it is the purpose of this invention to overcome.

I have found that the addition of an ester gum made from polymerized rosin and glycerine to paraffin wax imparts valuable properties to the wax. The water-resistance, grease-resistance, gloss and hardness of the wax are improved, the tendency of the wax to collect dirt is reduced, the wax has a less greasy feel, smears less, and there is less tendency to block or stick.

In order to accomplish these results, the wax and the esterified polymerized rosin are melted together and agitated until a homogeneous mixture is obtained. The combination is then applied, while still in the molten state, to the surface which it is desired to waterproof.

I am aware of the fact that ester gums made from commercial wood and gum rosins have been used with paraffin wax but difficulty is experienced with these products in practical usage due to separation of the resin upon continued heating. This appears to be due to oxidation of the resin and, as the oxidized product is no longer soluble in the wax, it separates. The more the ester gum is diluted with wax, the more readily does this separation take place. When mixtures of ordinary ester gum and paraffin wax are cooled and then remelted, separation also takes place, whereas esterified polymerized rosin does not precipitate under these conditions and a clear, homogeneous melt is obtained.

Ester gum made from polymerized rosin and glycerine is not only compatible with paraffin wax but with a number of natural and synthetic waxes such as carnauba, candelilla, beeswax, montan, ozokerite, as well as waxy substances such as stearic acid and cetyl alcohol. I prefer, however, to use paraffin wax on account of its low cost, light color and availability.

Ester gums can be made from polymerized rosin using other polyhydric such as ethylene glycol, di ethylene glycol, tri ethylene glycol, diglycol, sorbitol, mannitol, erythritol, and pentaerythritol. Glycerine, however, gives a resin with a melting point which is particularly well adapted for use with paraffin wax and, in addition, is comparatively cheap.

To prepare the glycerol ester of polymerized rosin, the following formulation was used:

| | Per cent |
|---|---|
| Polymerized rosin | 90.5 |
| 98% glycerine | 9.5 |

The polymerized rosin was melted and heated to 220° C. The glycerine was then added and the temperature gradually increased to 280° C. The temperature was held here until an acid number of 12 was obtained. At this point, a vacuum of 20 to 21 inches was applied and maintained until the acid number dropped to 6 to 8. The finished resin met the following specifications:

| | |
|---|---|
| Melting Point (capillary tube method) °C | 84–86 |
| Color (U. S. rosin standards) | N–WG |
| Acid number | 6–8 |

Resins that are used in coatings that are to be applied to paper and employed for wrapping food products must be non-toxic. For this reason, toxicity tests were made on the ester gum made from polymerized rosin and glycerine. A group of eight rats were selected for the experiment to determine any chronic effects of the resin when supplied daily over a thirty day period. At the end of the thirty days all animals were sacrificed and autopsies performed to determine any effects that might be attributable to the test material. From the gross appearance and examination of the organs, as well as weight gain it was definite that the animals were in a normal, healthy state and the resin had no toxic effects.

An ester gum made from hydrogenated rosin and glycerine was also found to have excellent stability with paraffin wax when subjected to continuous heating over a long period of time.

To prepare this resin, the following formulation was used:

| | Per cent |
|---|---|
| Hydrogenated rosin | 90.5 |
| 98% glycerine | 9.5 |

The hydrogenated rosin was melted and heated to 210° C. and the glycerine was then added.

The temperature was gradually increased to 270° C. and the temperature held at this point until an acid number of 12 was reached. A vacuum of 20 to 21 inches was then applied and maintained until the acid number dropped to 6 to 8. The finished resin had the following specifications:

| | |
|---|---|
| Melting point (capillary tube)____°C__ | 54–56 |
| Color (U. S. rosin standards)_____ | WW–WG |
| Acid number_____ | 6–8 |

It will be observed that the ester of the polymerized rosin has a considerably higher melting point than the ester of hydrogenated rosin. It is, therefore, preferred for use with paraffin wax as films containing the hydrogenated rosin are more tacky and have a greater tendency to block or stick, and collect dirt. Under certain conditions, however, it may be desirable to make a blend of the esters of the two rosins or to make a mixed ester by esterifying a mixture of polymerized rosin and hydrogenated rosin.

Polymerized rosin and hydrogenated rosin were each blended with paraffin wax but found not to be as satisfactory as the esterified products. Esterification increases the melting point and improves the odor of the resin. This latter is of considerable importance when resins are used in coatings that come in contact with food products. In addition, the polymerized rosin was found to have its heat stability increased when esterified.

As the resin content of a wax coating is increased, it becomes desirable to add a plasticizer to obtain proper flexibility. I have found that a plasticizer containing branched chain olefinic hydrocarbons of relatively high molecular weight is particularly satisfactory as it is compatible with both the resin and the wax. One group of viscous polymers that may be used are those produced by the polymerization of normally gaseous mono-olefins, such as the butenes, by catalytic contact with aluminum chloride and which have a viscosity in the neighborhood of 3000 Saybolt seconds Universal at 210° F. Such a constituent is substantially inert, light in color, and maintains the composition in a plastic condition for a long period of time.

By polymerized rosin I mean a commercial grade of rosin that has been treated to increase the molecular weight and melting point and to reduce the unsaturated characteristics of the rosin. This polymerization can be carried out in solution using reagents capable of causing polymerization such as sulphuric acid, boran tri fluoride, an anhydrous metallic chloride such as an anhydrous chloride of aluminum, tin, zinc, titanium or the like, ultra violet light or other polymerizing agents.

By hydrogenated rosin I mean an acid resin which consists of partially and completely hydrogenated acid and non-acid constituents of rosin.

In general, the formula preferred is as follows:

| | Per cent |
|---|---|
| Resin_____ | 10–80 |
| Wax_____ | 20–90 |
| Plasticizer_____ | 0–20 |

By resin I mean an esterified polymerized rosin, a hydrogenated rosin or a mixture or blend of the two.

By wax I mean natural, or synthetic, waxes or waxlike materials.

By plasticizer I mean an agent used to increase flexibility.

More specific formulas which have been found to give satisfactory results are:

(a)

| | Per cent |
|---|---|
| Glycerol ester of polymerized rosin_____ | 80 |
| Paraffin wax_____ | 20 |

(b)

| | |
|---|---|
| Glycerol ester of polymerized rosin_____ | 50 |
| Paraffin wax_____ | 45 |
| Plasticizer—branched chain olefinic hydrocarbon_____ | 5 |

I claim:

1. A waterproofing composition comprising a mixture of a waxy substance and an ester gum of a polyhydric alcohol and polymerized rosin; the waxy substance being selected from a group consisting of paraffin wax, carnauba wax, candelilla wax, beeswax, montan wax, ozokerite, stearic acid and cetyl alcohol; and the polyhydric alcohol being selected from a group consisting of glycerine, ethylene glycol, di-ethylene glycol, tri-ethylene glycol, diglycol, sorbitol, mannitol, erythritol, and pentaerythritol; the ester gum being used in proportion of 10 to 80% of the composition and the waxy substance being used in the proportion of 20 to 90%.

2. A waterproofing composition as set forth in claim 1, wherein the polyhydric alcohol is glycerine.

3. A waterproofing composition as set forth in claim 1, wherein the waxy substance is paraffin wax.

4. A waterproofing composition as set forth in claim 1, which includes a plasticizer.

5. A waterproofing composition as set forth in claim 1, which includes a plasticizer comprising a branched chain olefinic hydrocarbon.

6. A fibrous foundation coated with the waterproofing composition set forth in claim 1.

7. A waterproofing composition comprising a mixture of a waxy substance, an ester gum made from a polyhydric alcohol and a polymerized rosin, and an ester gum made from a polyhydric alcohol and hydrogenated rosin; the waxy substance being selected from a group consisting of paraffin wax, carnauba wax, candelilla wax, beeswax, montan wax, ozokerite, stearic acid and cetyl alcohol; and the polyhydric alcohol being selected from a group consisting of glycerine, ethylene glycol, di-ethylene glycol, tri-ethylene glycol, diglycol, sorbitol, mannitol, erythritol, and pentaerythritol; the ester gum being used in proportion of 10 to 80% of the composition and the waxy substance being used in the proportion of 20 to 90%.

8. A waterproofing composition comprising a mixture of paraffin wax and an ester gum made from glycerine and polymerized rosin; the ester gum being used in the proportion of 10 to 80% of the composition and the wax being used in the proportion of 20 to 90%.

9. A waterproofing composition comprising a mixture of paraffin wax, an ester gum made from glycerine and polymerized rosin and an ester gum made from glycerine and hydrogenated rosin; the ester gum being used in the proportion of 10 to 80% of the composition and the wax being used in the proportion of 20 to 90%.

JAMES FRANCIS MAGUIRE.